United States Patent [19]

Przybylowicz et al.

[11] 4,080,292
[45] Mar. 21, 1978

[54] TANK FOR AGITATION AND AERATION OF SEWAGES

[75] Inventors: Ryszard Przybylowicz; Czeslaw Zabierzewski, both of Warsaw, Poland

[73] Assignee: Biuro Projektowo-Konstrukcyjne Centralnego Zwiazku Spoldzielni Mleczarskich, Warsaw, Poland

[21] Appl. No.: 693,926

[22] Filed: Jun. 7, 1976

[30] Foreign Application Priority Data

Jun. 9, 1975 Poland .................................. 181071
May 13, 1976 Poland .................................. 189527

[51] Int. Cl.² ............................. C02C 1/10; B01F 3/04
[52] U.S. Cl. .................................... 210/219; 210/220; 261/92
[58] Field of Search .................... 210/7, 14, 15, 63 R, 210/170, 195 S, 218, 219, 220, 221 R, 194, 195 R; 261/91, 92

[56] References Cited

U.S. PATENT DOCUMENTS

| | | |
|---|---|---|
| 3,101,321 | 8/1963 | Austin et al. ................. 210/195 S X |
| 3,458,176 | 7/1969 | Auler ................................ 261/92 X |
| 3,510,110 | 5/1970 | Klein ............................ 210/220 X |
| 3,760,946 | 9/1973 | Boler ........................... 210/195 S X |
| 3,809,242 | 5/1974 | Bosje ............................. 210/195 S |
| 3,947,358 | 3/1976 | Schreiber et al. ............. 210/220 X |

Primary Examiner—Charles N. Hart
Assistant Examiner—Robert H. Spitzer
Attorney, Agent, or Firm—Haseltine, Lake & Waters

[57] ABSTRACT

Tank for agitation and aeration of municipal and industrial wastes. In a simple manner, turbine-type aerators are installed along the longitudinal axis of a tank, between which partitions (e.g. "(2)") are arranged, dividing the tank into at least two connected ditches. In these ditches aerating brushes or mammoth rotors (e.g. "(2)") are installed. In a multi-ditch system the tank is (e.g. "(2)") divided into several ditches. At joints of the partitions (e.g. "(2)") or in these partitions themselves, recesses (4) are made that reach below the level of the liquid, in which the turbine-type aerators (e.g. "(2)") are installed.

4 Claims, 4 Drawing Figures

TANK FOR AGITATION AND AERATION OF SEWAGES

This invention relates to a tank for agitation and aeration of sewage and more particularly to a tank, appropriate for biological sewage treatment by means of activated sludge.

Known tanks used for biological sewage treatment by means of activated sludge are described in the professional literature and in patents, including in U.S. Pat. Nos. 3,704,733; 3,728,254; 3,760,946; 3,839,198; and 3,840,457.

Tanks appropriate for biological sewage treatment by means of activated sludge are built as reinforced concrete or steel chambers having various forms and being provided with devices for the aeration and agitation of sewage. The aeration and agitation is performed by introducing compressed air into the chambers, or by providing them with brushes, rotors or turbine-type aerators.

The treatment process the chambers is more efficient if it is followed by a complete mixing with air of raw sewage being fed, of the recirculated activated sludge, and of the liquid contained in the tank.

The rate of mixing of the agents and the securing of optimum hydraulic conditions depend mainly on the construction of the chamber, and on the type and arrangement of the aerating equipment therein. In known chambers with horizontal flow, the motions and turbulence of the liquid are caused by agitators, rolls, brushes, mammoth rotors and turbine-type aerators, such as, for instance in Haworth's chambers, circulation ditches, Passavant's chambers or whirling chambers.

A disadvantage of the chambers consists in considerable differences of the rate of flow and turbulence both in the longitudinal direction and in cross-section, which is especially remarkable with changes of the direction of liquid from within the chamber. Dimensioning of the chambers, mainly their length and depth, is in a great measure restricted by the spacing and arrangement of the aerating devices.

The invention is aimed at obtaining highest efficiency of the treatment process by the way of providing such hydraulic configurations and such turbulence within the chamber, for the activated sludge to be always in a suspended condition and uniformly distributed in each part of the chamber together with a proper quantity of oxygen.

The essence of the present invention is the provision of a tank for the agitation and aeration of sewage, having any desired volume, divided with partitions into ditches in such a way that the liquid to be treated flows in a closed circuit. In the partitions dividing the tank into ditches, at the ends thereof or at joints, turbine-type aerators are installed. The partitions have over their entire length a height equal to or higher than the height of the stream of the liquid being treated, while at places where the turbine-type aerators are installed the partitioning walls are provided with recesses reaching below the liquid level.

In its simplest design the tank is divided by the partition into two ditches with equal cross-sections. Inside the tank, in its longitudinal axis, the turbine-type aerators are arranged, whereas partitions are mounted between the latter, extending to the entire depth of the tank.

The flow of liquid in the ditch or ditches is caused by a part of the aerator rotor, which when generating horizontal and vertical turbulence produces best hydraulic conditions within the whole system of the tank.

Moreover, aerating or mammoth rotors are arranged in both ditches of the tank, having a sense of rotation that conforms to the direction of flow, given by the turbine-type aerators.

The sewage treatment proceeds as described hereinbelow:

The raw sewage being fed from the works is mixed in an inlet ditch with regenerated, return activated sludge, and thereafter is introduced into the tank in its middle part near the brush or the aerator, near the tank bottom, perpendicularly to the stream of the liquid flowing through the tank.

Thus each stream filament of displacing liquid is mixed with a stream of supplied raw sewage, being mixed previously with the regenerated return activated sludge.

The turbulent rotational motion of the liquid, generated by the turbine-type aerators, and the turbulent horizontal motion of the liquid, generated by the brushes or rotors, cause quickest and most thorough mixing of the liquid with the air supplied by the aerating devices. Owing to the action of the latter, the sludge in the tank remains in a suspension in the liquid, in equal amounts in all parts of the tank.

Treated sewage is drained from the tank at the end thereof opposite the inlet, and is supplied to a secondary settling tank, wherefrom, on settling the sludge, it is in clear condition delivered to the receiver.

The invention will be now described in greater detail by way of an exemplary embodiment with reference to the accompanying drawing in which FIG. 1 is a top view of a basic tank structure for the agitation and aeration of sewage;

Figure 1:
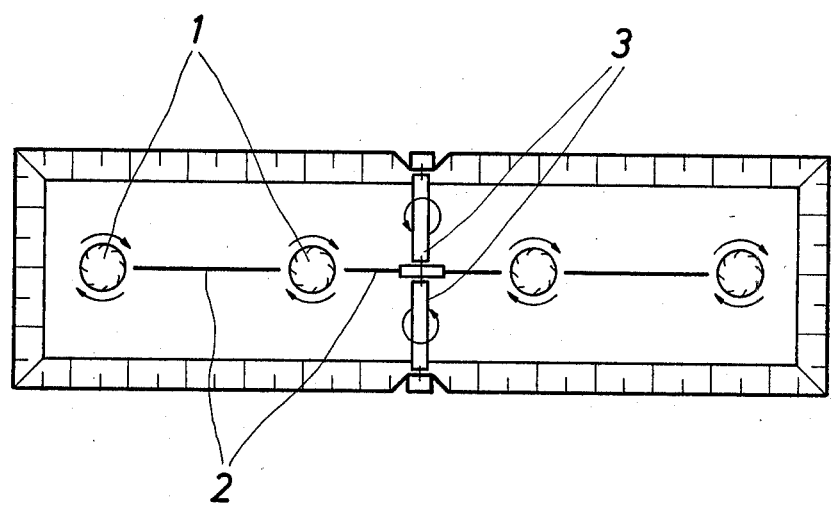
Figure 2:
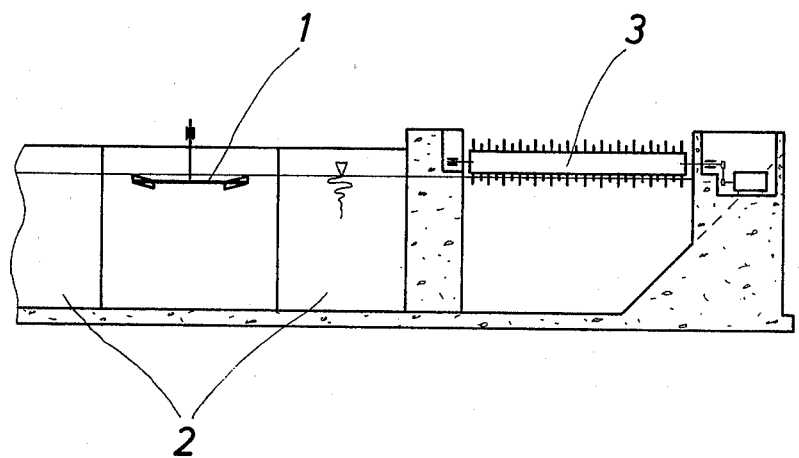
FIG. 2 is a cross-sectional view of the tank, taken at installing points of a turbine and a brush.

In FIGS. 1 and 2, a tank forms a chamber on the main axis whereof turbine-type aerators 1 are installed. Between the aerators partitions 2 are arranged, dividing the tank into two connected ditches of the whole depth in the chamber. In both ditches of the tank aerating brushes or mammoth aerators 3 are installed.

Figure 3:
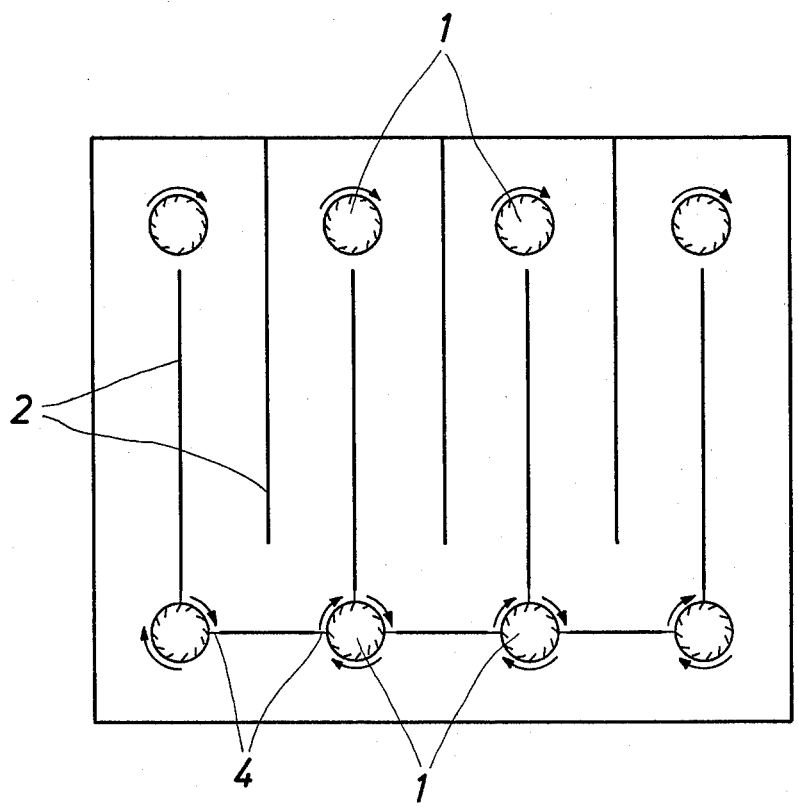
FIG. 3 is a top view of a multi-ditch tank.
Figure 4:
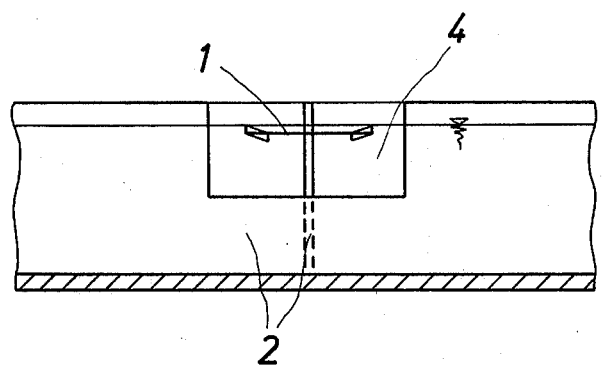
FIG. 4 is a cross-sectional view of the tank of FIG. 3, taken at the place of installation a turbine-type aerator at the joint of three walls.

The tank for agitation and aeration of sewage can also be made as a multi-ditch system, as shown in FIGS. 3 and 4.

In FIGS. 3 and 4 the tank forms a chamber of rectangular shape. The partitions 2 are mounted inside the tank, dividing the same into ditches. The turbine-type aerators 1 are installed at places of joining the walls or at the ends thereof. Recesses 4 are made in the partitions 2, dividing the tank into ditches that reach down below the level of the liquid, the turbine-type aerators 1 being installed in the recesses 4.

The advantage of the inventive tank is the attainment, in a highly economic way, of improved effects of sewage treatment by means of the activated sludge. At the moment of introducing the raw sewage, complete and full mixing occurs, together with the necessary aeration thereof.

Owing to the construction of the tank and to the installation of the aerating devices therein, a hydraulic system is provided in which the activated sludge is present equal quantities in each portion thereof, in a suspended condition, and also the content of oxygen in the liquid is equal in each part of the tank. An additional advantage of the tank according to the invention is the possibility of building tanks with unlimited volumes.

What is claimed is:

1. A tank arrangement for the agitation and aeration of sewage, comprising a tank having a generally uniform depth and a substantially rectangular shape in horizontal cross-section; turbine-type aerators (1) in said tank; said aerators being rotatable about a vertical axis, said aerators being longitudinally spaced in said tank, longitudinally extending straight partitions (2) arranged between said aerators and dividing the tank into at least two interconnected adjacent ditches; and at least one aerating means (3) including a brush rotatable about a horitzontal axis installed transversely in said ditches; the aerators and aerating means being so arranged and rotated so that both vertical and horizontal turbulence are produced throughout said tank in said adjacent ditches in which there are different directions of horizontal flow such that said turbulence maintains the activated sludge in suspended condition uniformly distributed throughout the tank together with a proper quantity of oxygen.

2. The tank arrangment as claimed in claim 1, wherein said partitions (2) are provided with recesses (4) therein that extend down below the level of the liquid in said tank; and wherein said turbine-type aerators (1) are installed in said recesses.

3. The tank arrangement as claimed in claim 2, wherein said partitions (2) include walls, selected of which are connected at joints, and said recesses (4) are provided in the joints between the selected said walls.

4. The tank arrangement as claimed in claim 1 wherein the partitions are installed along the axis of said tank.

* * * * *